Oct. 18, 1960   T. A. DEAKINS ET AL   2,956,319
MOLD ELEVATING AND COPE STRIPPING AND DRAG TURNOVER
FACILITIES FOR MOLD ASSEMBLING INSTALLATION
Filed June 16, 1958   14 Sheets-Sheet 1

INVENTORS
T. A. Deakins
J. A. Lasater
S. C. Northington, Jr.

C. F. Bryant
ATTORNEY

Oct. 18, 1960 T. A. DEAKINS ET AL 2,956,319
MOLD ELEVATING AND COPE STRIPPING AND DRAG TURNOVER
FACILITIES FOR MOLD ASSEMBLING INSTALLATION
Filed June 16, 1958 14 Sheets-Sheet 2
Fig. 2.
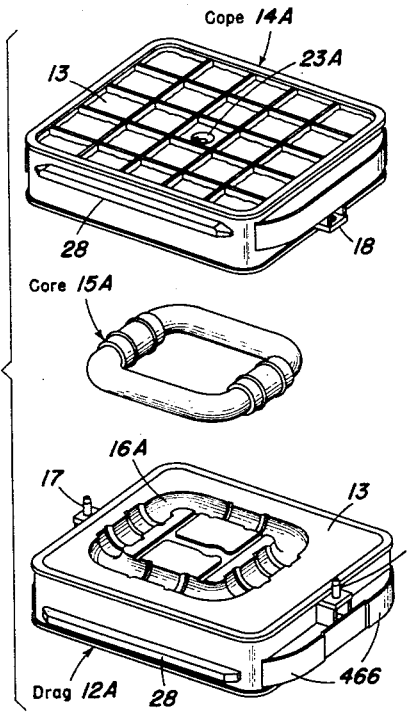
Fig. 5.
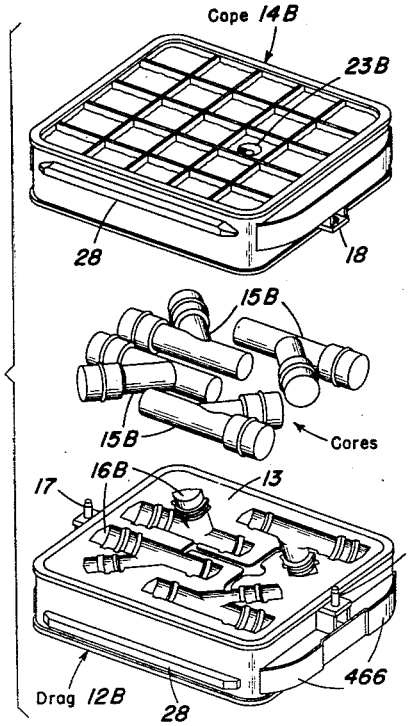
Fig. 4.
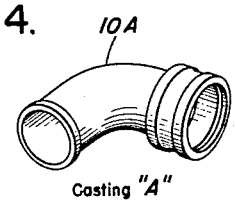
Fig. 3.
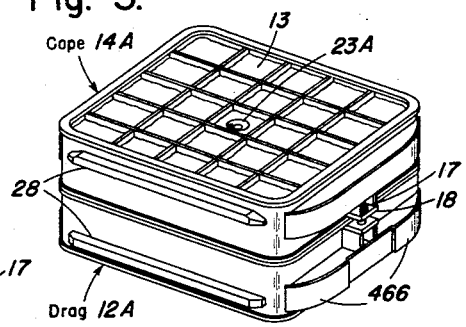
Fig. 7. Casting "B"
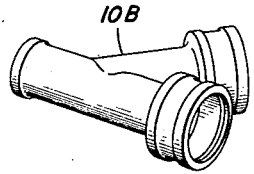
Fig. 6.
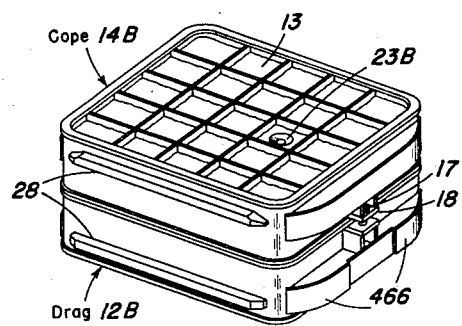
INVENTORS
T. A. Deakins
J. A. Lasater
S. C. Northington, Jr.
C. J. Bryant
ATTORNEY Oct. 18, 1960 T. A. DEAKINS ET AL 2,956,319
MOLD ELEVATING AND COPE STRIPPING AND DRAG TURNOVER
FACILITIES FOR MOLD ASSEMBLING INSTALLATION
Filed June 16, 1958 14 Sheets-Sheet 5

Mold Elevator and Cope Stripper 470 at Station VI

INVENTORS
T. A. Deakins
J. A. Lasater
S. C. Northington, Jr.
ATTORNEY

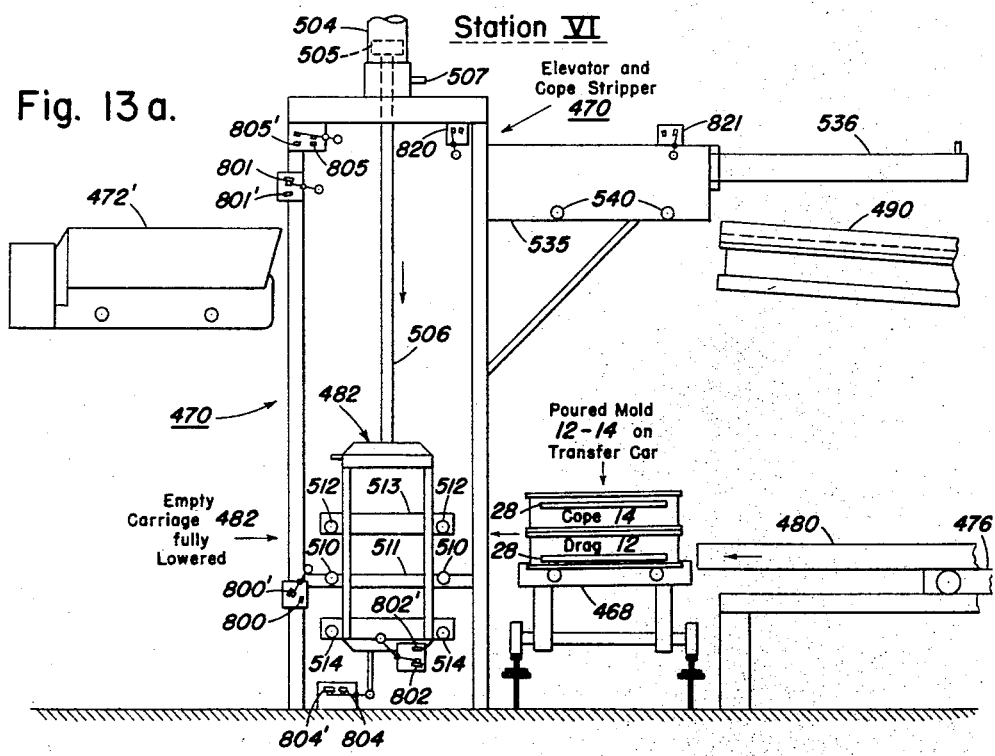
Fig. 13a.
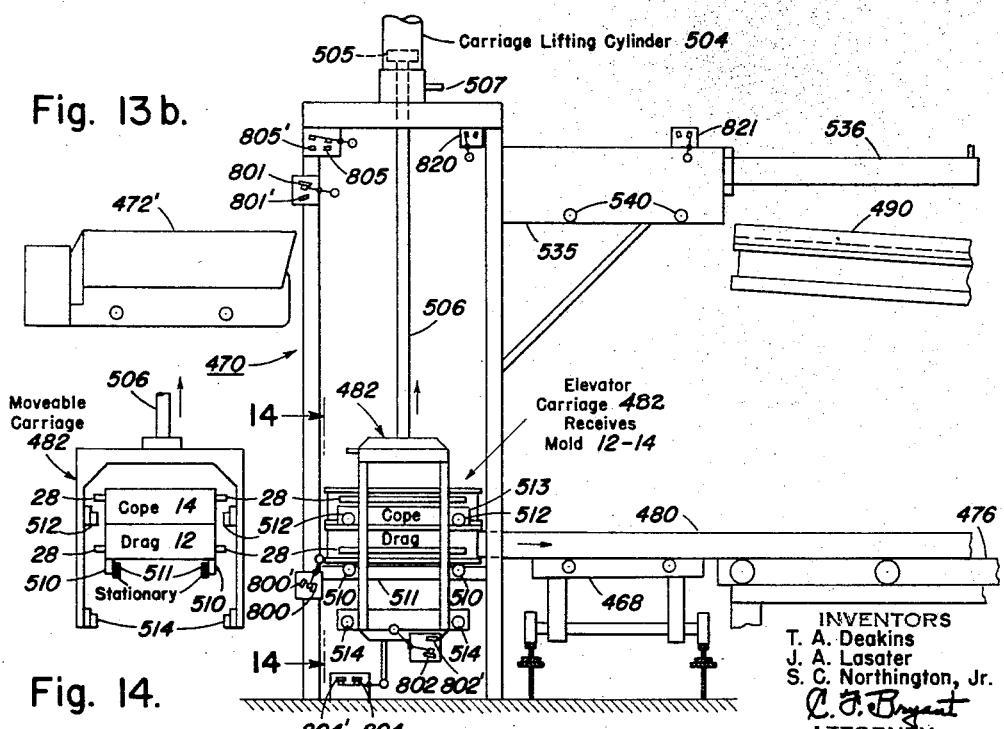
Fig. 13b.
Fig. 14.

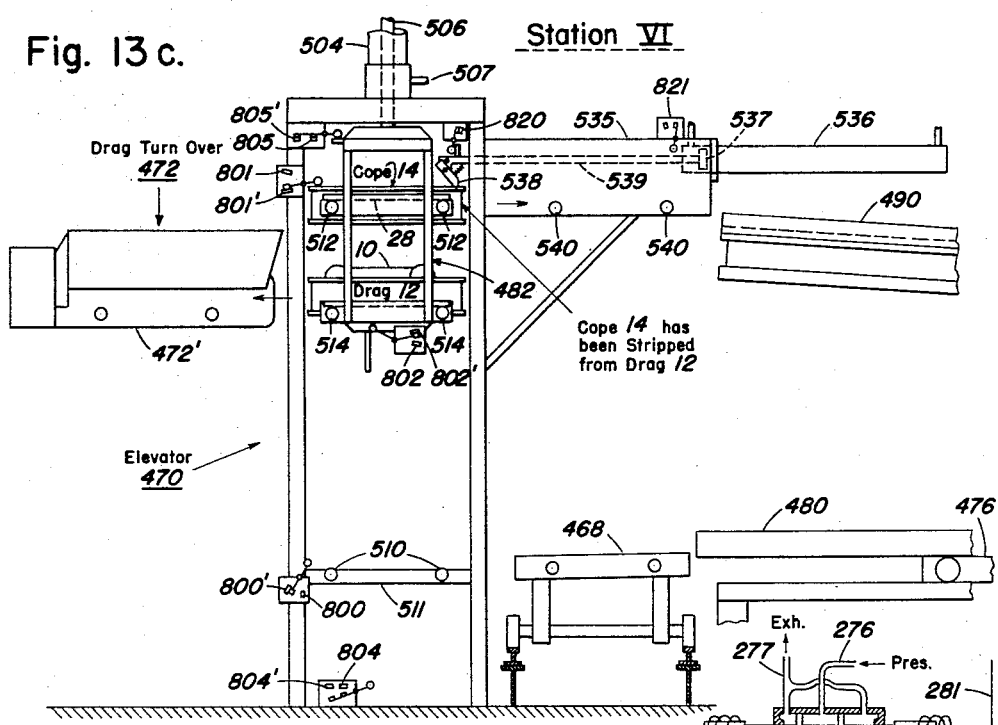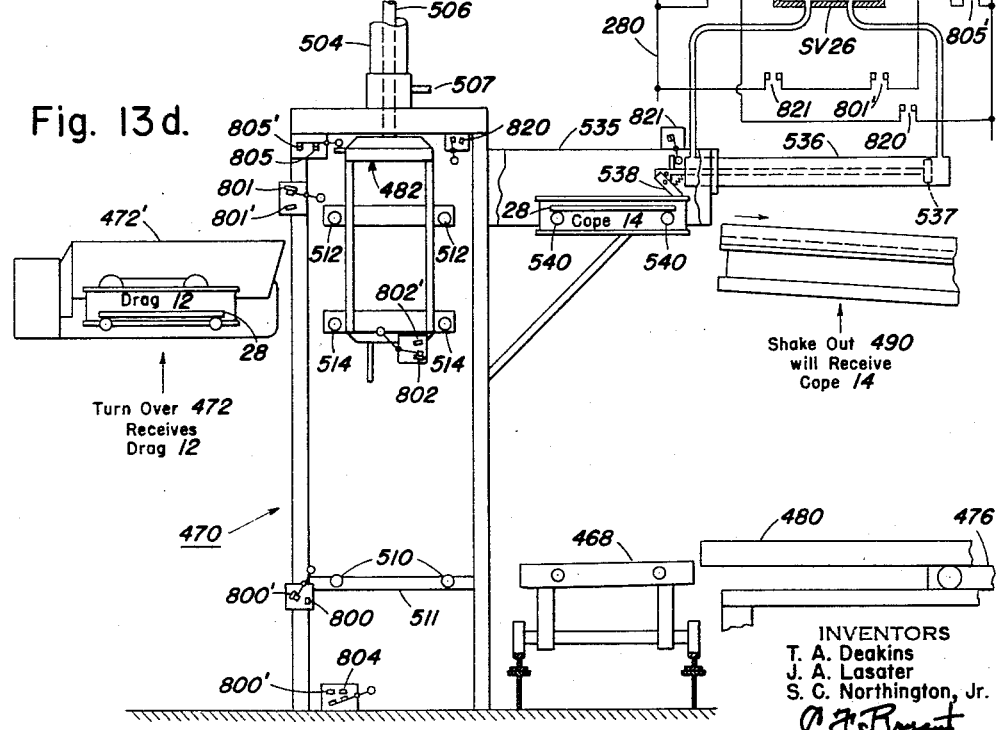

Oct. 18, 1960 T. A. DEAKINS ET AL 2,956,319
MOLD ELEVATING AND COPE STRIPPING AND DRAG TURNOVER
FACILITIES FOR MOLD ASSEMBLING INSTALLATION
Filed June 16, 1958 14 Sheets-Sheet 9

INVENTORS
T. A. Deakins
J. A. Lasater
S. C. Northington, Jr.

ATTORNEY

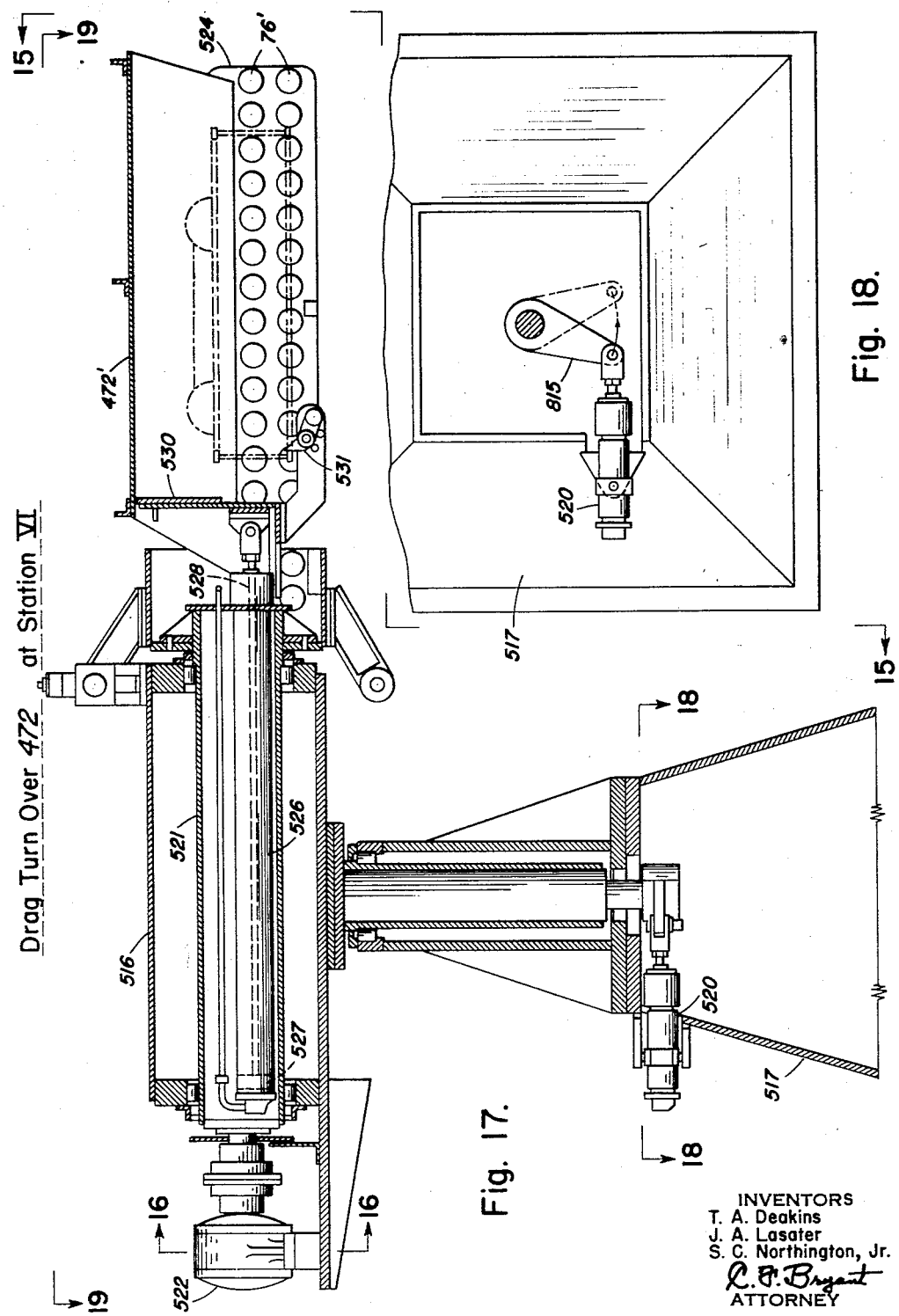

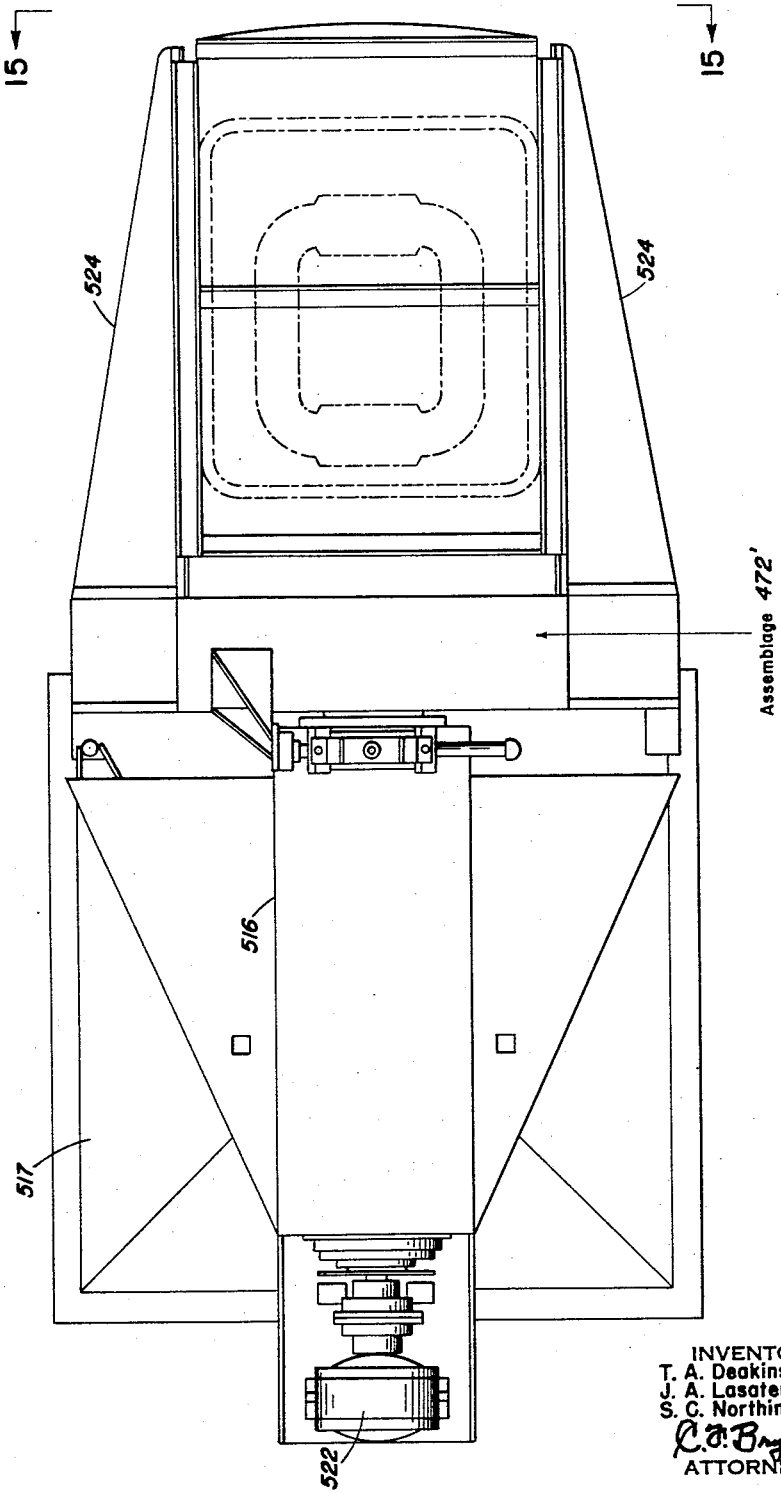

Drag Turn Over *472* at Station VI

INVENTORS
T. A. Deakins
J. A. Lasater
S. C. Northington, Jr.
ATTORNEY

Drag Turn Over at Station VI

Oct. 18, 1960    T. A. DEAKINS ET AL    2,956,319
MOLD ELEVATING AND COPE STRIPPING AND DRAG TURNOVER
FACILITIES FOR MOLD ASSEMBLING INSTALLATION
Filed June 16, 1958     14 Sheets-Sheet 14

INVENTORS
T. A. Deakins
J. A. Lasater
S. C. Northington, Jr.
C. F. Bryant
ATTORNEY

United States Patent Office 2,956,319
Patented Oct. 18, 1960

2,956,319

MOLD ELEVATING AND COPE STRIPPING AND DRAG TURNOVER FACILITIES FOR MOLD ASSEMBLING INSTALLATION

Thomas A. Deakins, Chattanooga, Tenn., John A. Lasater, Tyler, Tex., and Samuel C. Northington, Jr., Lookout Mountain, Tenn., assignors to Combustion Engineering, Inc., New York, N.Y., a corporation of Delaware Filed June 16, 1958, Ser. No. 742,324

6 Claims. (Cl. 22—34)

This invention relates to new and improved facilities for elevating poured molds and for stripping the copes therefrom and for turning the drags thereof over in mold assembling installations such as are shown and described by an earlier application Serial No. 731,426 which was filed April 28, 1958 in the names of Thomas A. Deakins and John A. Lasater and Samuel C. Northington, Jr. and which is entitled "Mechanized Facilities for Producing and Assembling Foundry Molds of Alternately Differing Types" and of which this present application is a continuation-in-part; and the subject matter of the present application is in part disclosed by and has in part been reproduced from our said earlier application Serial 731,426.

Broadly stated, the object of our invention is to provide novel mold elevating and cope stripping and drag turnover means which are more compact than and more fully automated than and otherwise superior to the corresponding means that are disclosed by a still earlier application Serial No. 200,899 (now abandoned) which was filed December 15, 1950 in the names of Samuel C. Northington, Jr. and John A. Lasater and which on May 31, 1955 was replaced by a continuation application Serial No. 511,941 then filed on the same subject matter under title of "Apparatus and Method for Assembling Foundry Molds" and now issued as U.S. Patent 2,850,775 dated September 9, 1958.

A more specific object is to improve the system layout of the just named earlier application Serial 511,941 by replacing the machine-encircling track 32 thereof with the new means here disclosed and claimed, which new means accomplish the same functions in an easier and better way.

Additional objetcs and advantages will become apparent as the disclosure and description hereof proceeds.

An illustrative form of apparatus provided by us for practicing this mold elevating and cope stripping and drag turn over invention is disclosed by the accompanying drawings wherein:

Fig. 2 is an exploded view showing the drag flask and the cope flask and the core components of a first or "A" type mold which the Fig. 1 installation assembles and pours;

Figure 1:
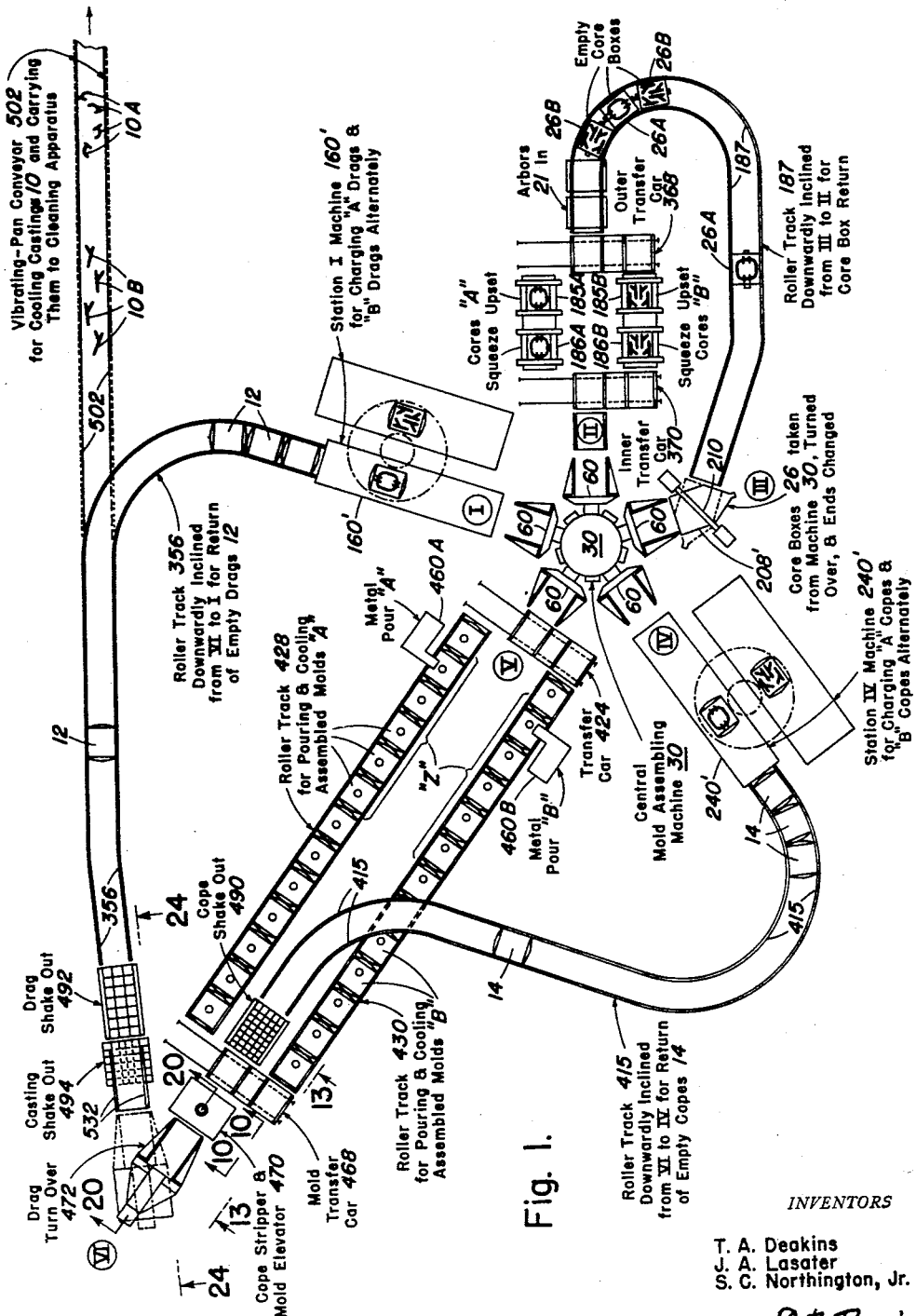
Fig. 1 is a diagrammatic showing in top plan view of the mold assembling installation that our earlier application Serial 731,426 discloses and claims and that includes a Station VI at which the improvements of the present invention are utilized.
Figure 8A:
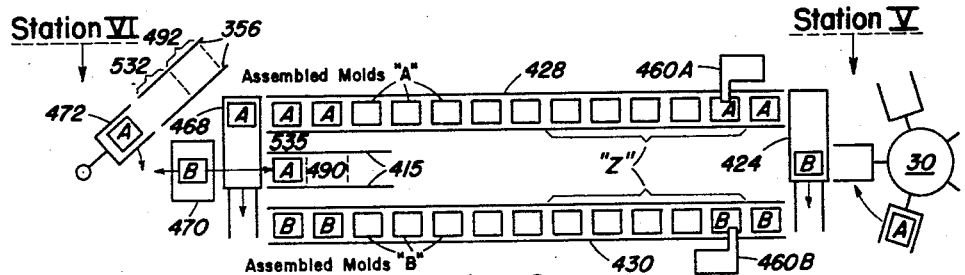
Figure 8B:
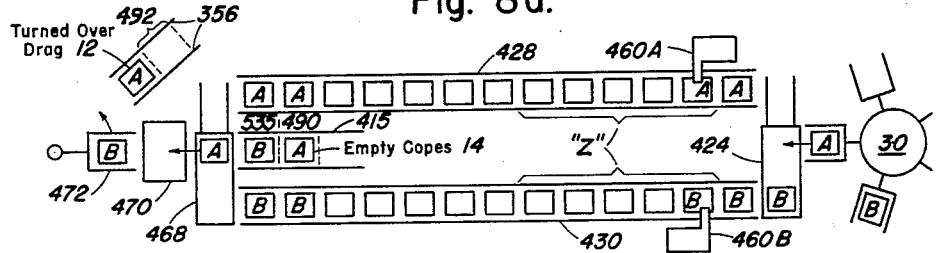
Figure 8C:
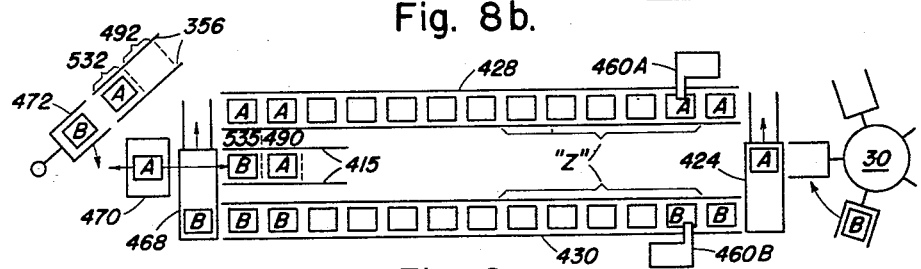
Figure 8D:
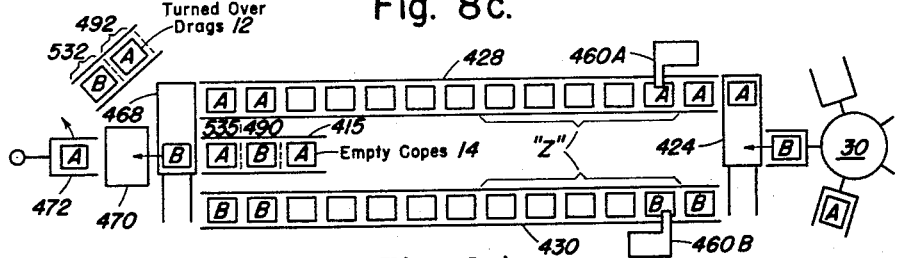
Figure 8E:
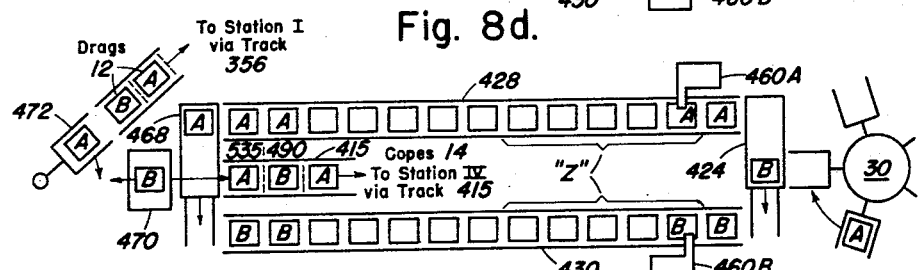
Figure 9:
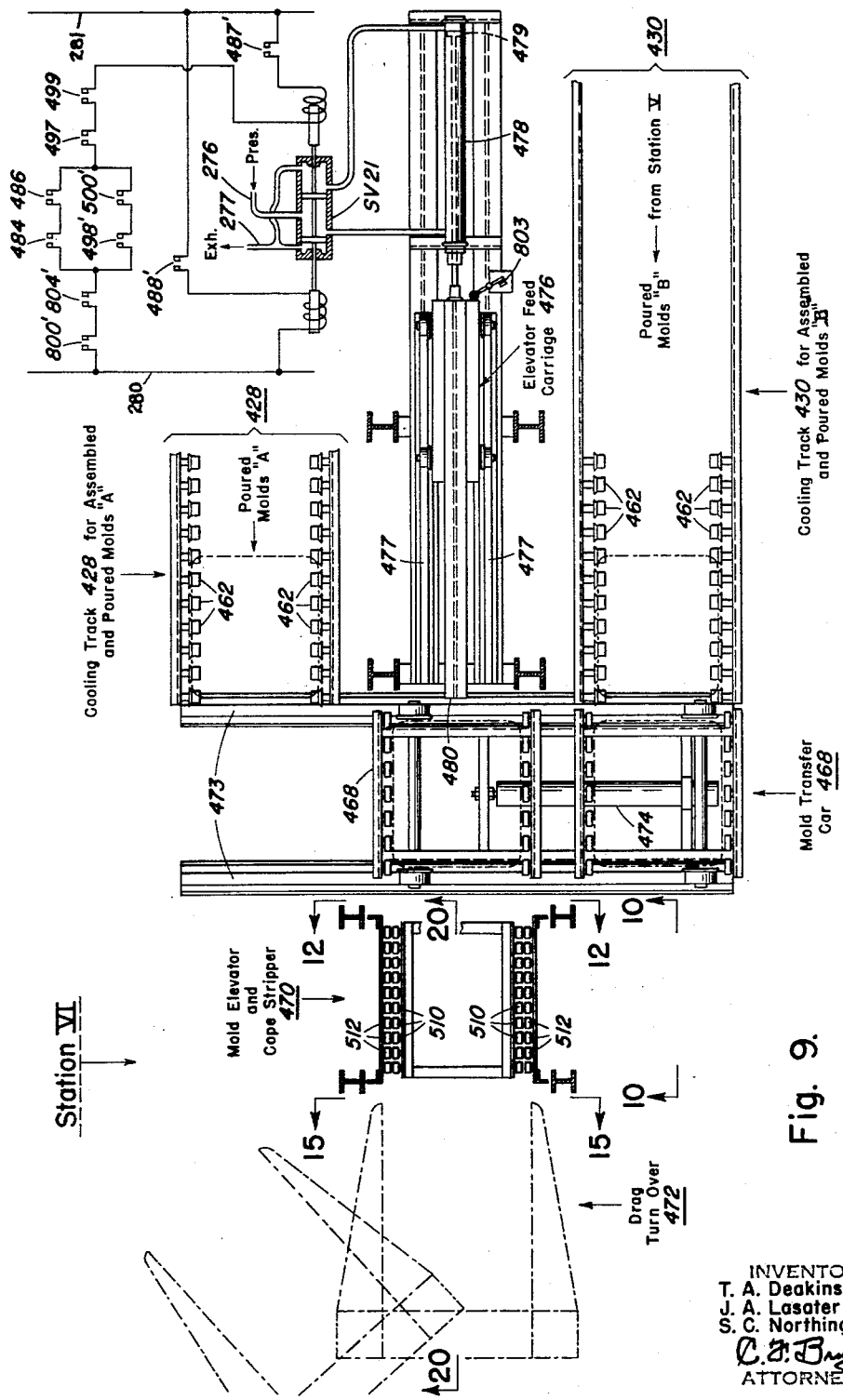
Figures 10, 11:
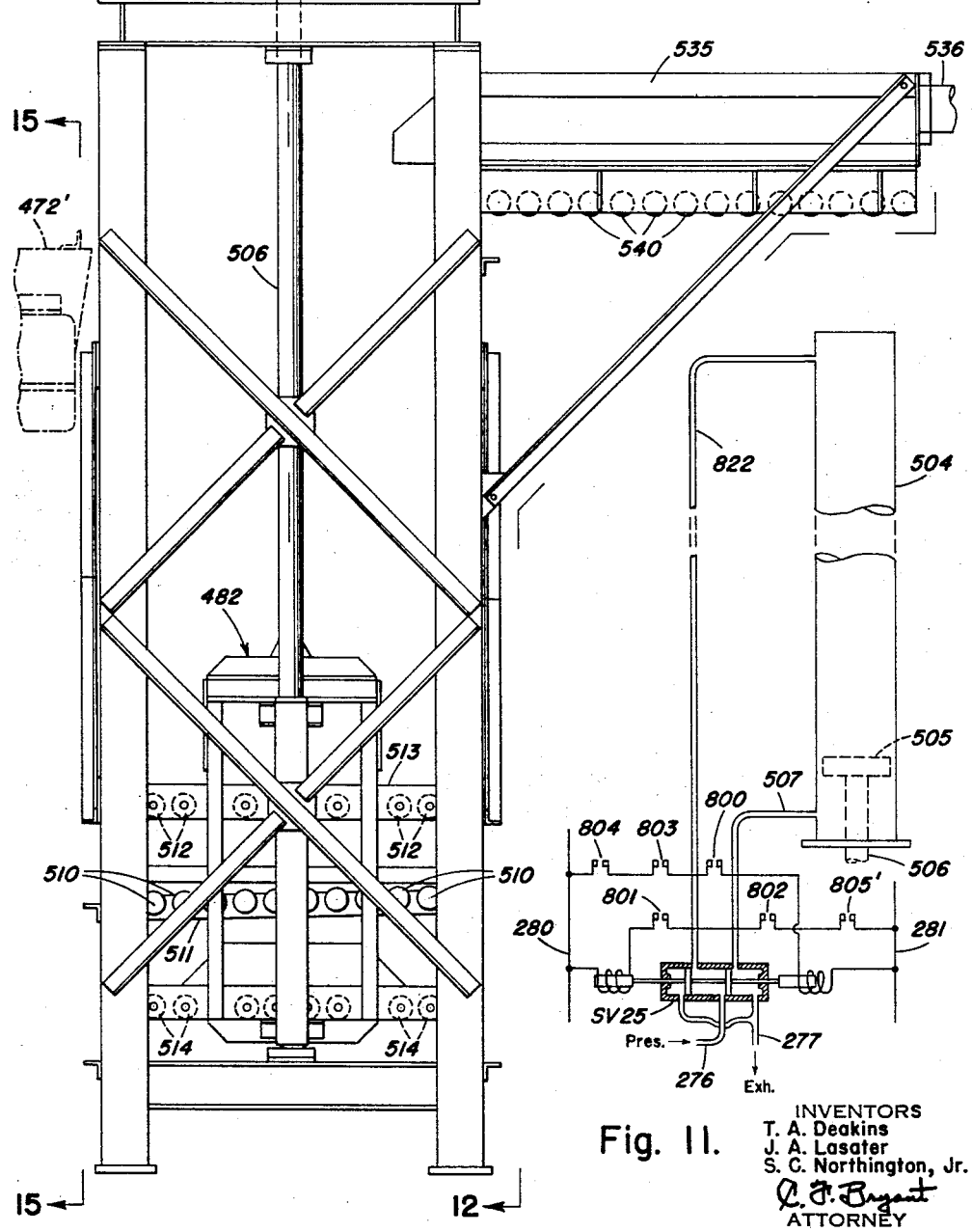
Figure 12:
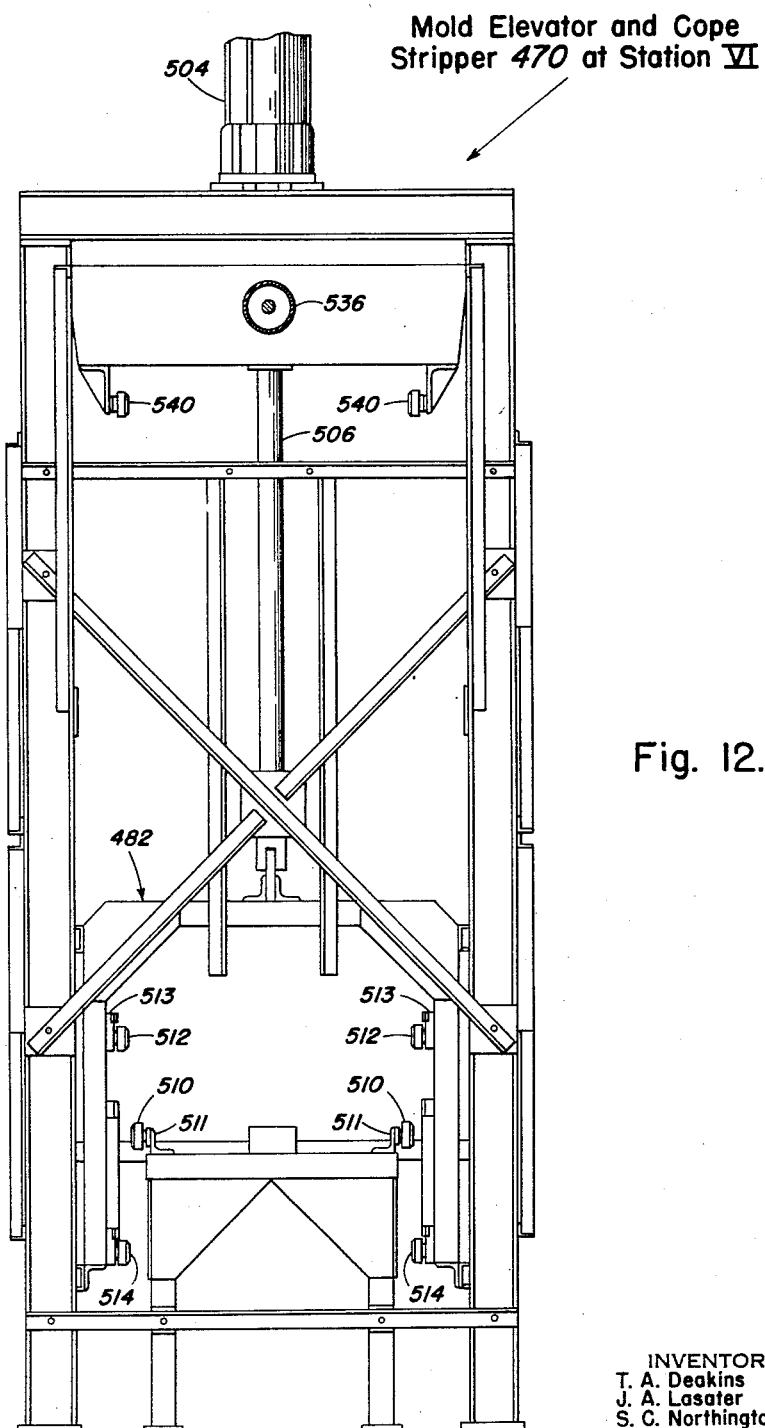
Figure 15:
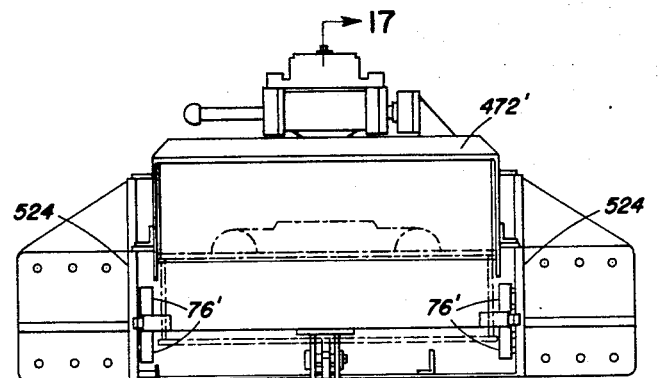
Figure 16:
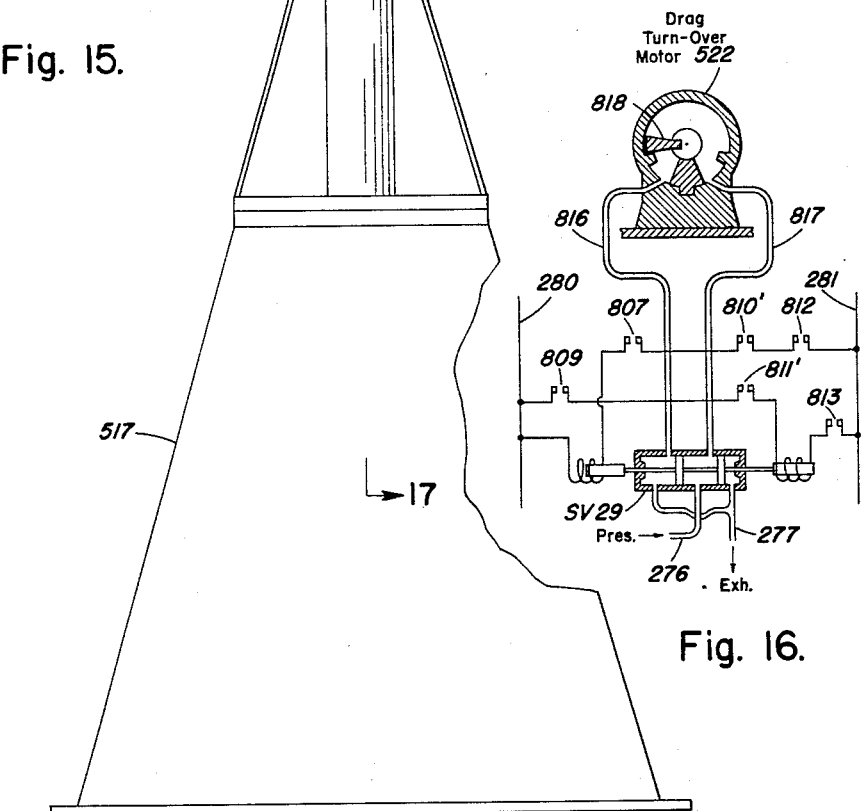
Figure 20:
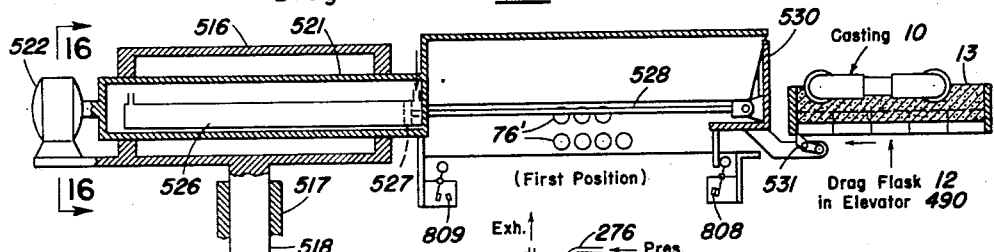
Figure 20A:
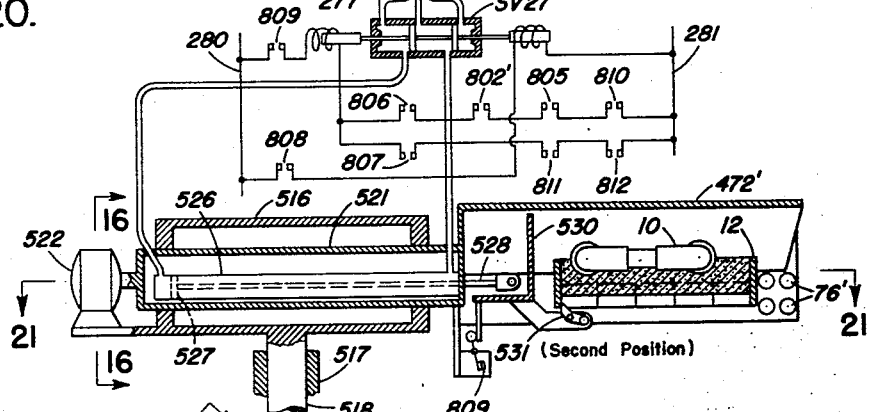
Figure 21:
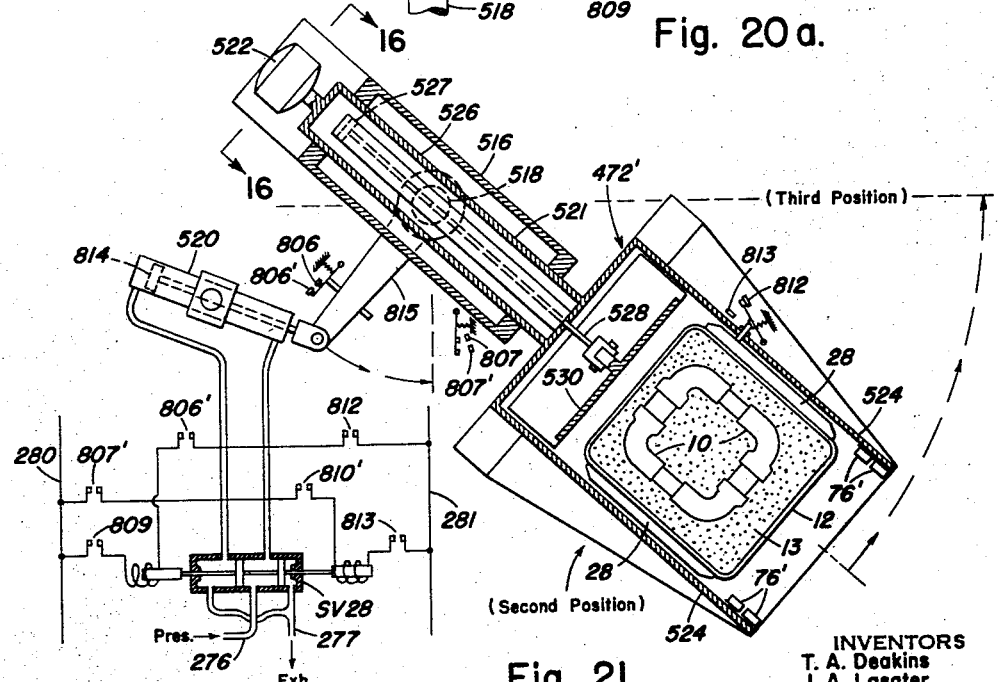
Figure 21A:
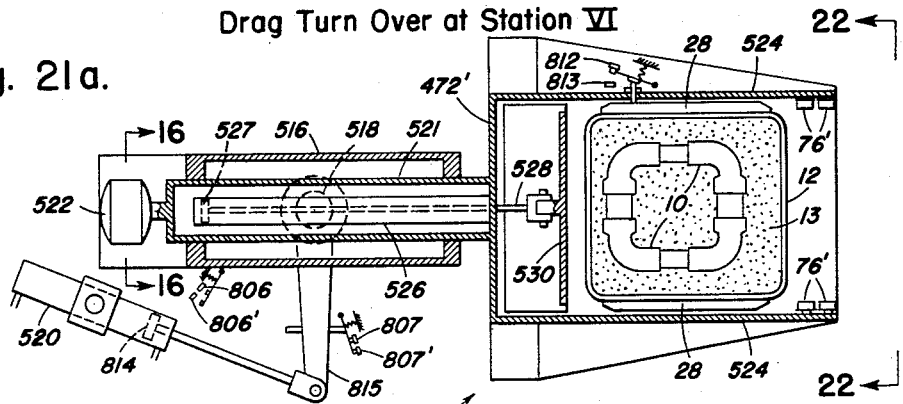
Figure 22:
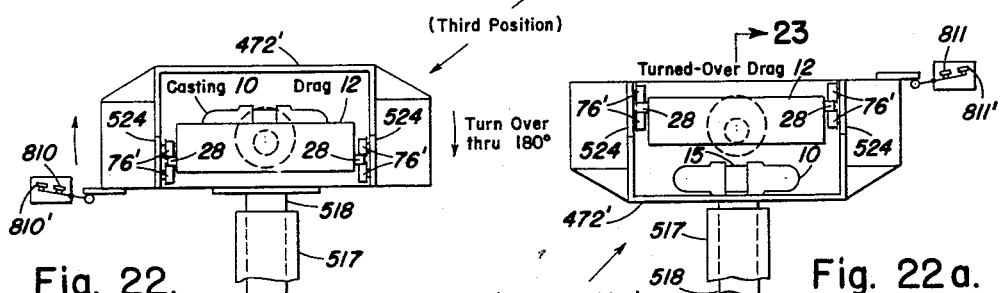
Figure 22A:
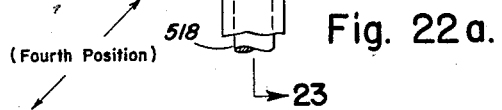
Figure 23:
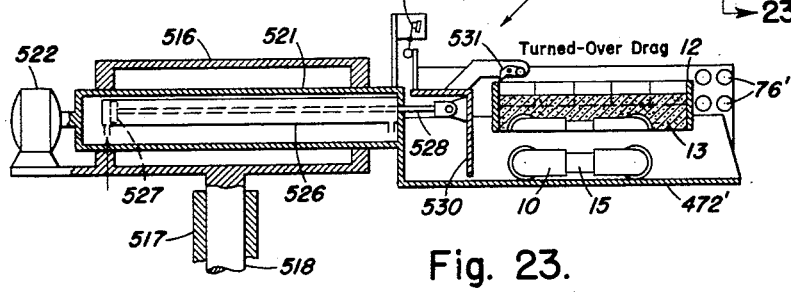
Figure 23A:
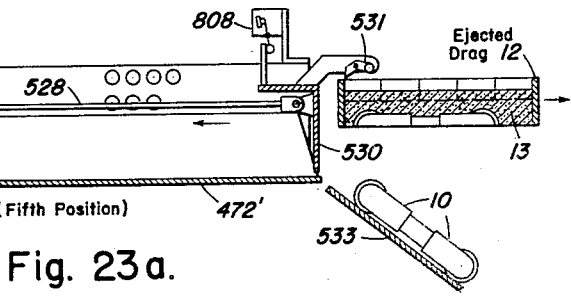
Figure 24:
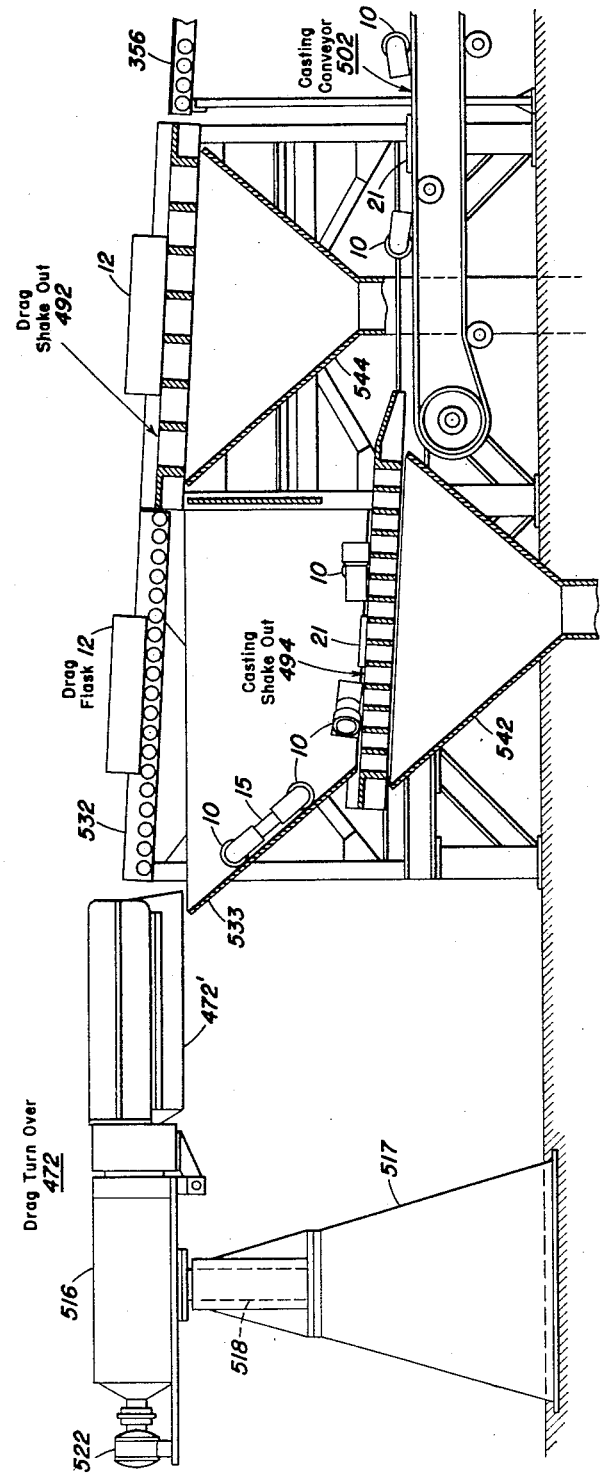

Fig. 3 indicates how the drag and cope and core of Fig. 2 appear after having been brought together by the central assembling machine 30 of said installation to produce an assembled mold of said "A" type;

Fig. 4 represents one of the "A" type castings which may be produced in the assembled mold of Fig. 3;

Fig. 5 is an exploded view showing the drag and cope and core components of a second or "B" type mold which the Fig. 1 installation also assembles and pours;

Fig. 6 shows a "B" type mold as assembled from said Fig. 5 components;

Fig. 7 represents one of the "B" type castings which may be produced in the assembled mold of Fig. 6;

Figs. 8a through 8e are Station V—VI operation diagrams in simplified top plan view form indicating how "A" and "B" molds delivered at Station V upon first and second pouring tracks of the Fig. 1 system move along those tracks to Station VI, and further indicating how such "A" and "B" molds upon reaching Station VI go into our new elevator 470 which strips the copes therefrom for return to Station IV and then delivers the drags into our new turnover apparatus 472 which empties the castings and sand therefrom preparatory to sending the empty drags back to Station I;

Fig. 9 illustrates the Station VI apparatus of Fig. 1 in an enlarged top plan view that reproduces Fig. 44 of earlier application Serial 731,426 and that shows certain details of the mold transfer car 468 and of the cooperating take off carriage 476 by which poured "A" and "B" molds as received by that car from the "A" and "B" pouring and cooling tracks 428 and 430 are fed from said car successively and in alternate "A" and "B" order into our new mold elevator and cope stripper 470 at Station VI;

Fig. 10 is an enlarged representation in elevation on line 10—10 of Figs. 1 and 9 which shows how said elevator and cope stripper apparatus appears when viewed from the side;

Fig. 11 illustrates more completely the top hydraulic cylinder by which the carriage in said elevator is raised and lowered, and also represents control means for said cylinder;

Fig. 12 is a representation on lines 12—12 of Figs. 9 and 10 showing how our aforesaid elevator and cope stripper appears when viewed from the front;

Figs. 13a through 13d are Station VI operation diagrams, in simplified side view from line 13—13 of Fig. 1, indicating how our Station VI elevator functions first to receive each poured mold from the adjacent transfer car, then to lift the cope away from the drag, next further to raise the stripped cope along with the drag now vertically spaced below the cope, thereafter to eject the drag with solidified castings into our cooperating turn over mechanism 472, and finally to transfer the empty cope upon a shakeout device;

Fig. 14 is a section on line 14—14 of Fig. 13b showing the specially coordinated support elements that are operative to accomplish cope stripping during mold elevation;

Fig. 15 is a representation on lines 15—15 of Figs. 9, 10, 17 and 19 showing how our aforementioned new turnover mechanism appears when viewed from the front;

Fig. 16 shows the vane-type hydraulic motor 522, as viewed in section on line 16—16 of Figs. 17 and 20 and 21, which forms a part of said drag turn over mechanism, and also represents control means for that turnover motor;

Fig. 17 is a sectional elevation on line 17—17 of Fig. 15 showing how various internal elements of the turn over mechanism are constructed and arranged;

Fig. 18 is a view on line 18—18 of Fig. 17 looking down upon the mechanism pedestal and the head-swinging cylinder 520 therein;

Fig. 19 is a view from line 19—19 of Fig. 18 showing how the turnover mechanism head and other parts appear when viewed from the top;

Fig. 20 is a simplified vertical section on line 20—20 of Figs. 1 and 9 showing the Station VI drag turn over device 472 in a first position ready to recive a drag flask with castings from the adjoining mold elevator;

Fig. 20a illustrates the Fig. 20 turn over device after elements thereof have moved to a second position and drawn the above mentioned drag flask from the elevator into the device;

Fig. 21 is a horizontal section on line 21—21 of Fig. 20a providing another view of the turnover device when in said second position;

Fig. 21a is a similar view in horizontal section showing the device after it has been swung counterclockwise from said second position to the represented new third position (shown dotted by Figs. 1 and 21) which prepares the apparatus for later turn over of the drag;

Fig. 22 is a front elevation on line 22—22 of Fig. 21a providing another view of the turnover device when in said third position;

Fig. 22a is a similar view in front elevation showing the device after elements thereof have rotated through 180° into the represented fourth position wherein the contained drag flask has been turned completely over around a horizontal axis with resultant dropping therefrom of the castings and some of the sand;

Fig. 23 is a vertical section on line 23—23 of Fig. 22a providing another view of the turn over device when in said fourth position;

Fig. 23a is a similar view in vertical section showing the device after elements thereof have pushed the turned-over drag and its carried castings out of the device and towards the drag and casting shakeouts that are represented in Figs. 1 and 24; and Fig. 24 is a view in side elevation from line 24—24 of Fig. 1 that shows the pedestal-mounted drag turn over device of the immediately preceding views and that also illustrates further features of the associated casting and drag shakeouts and of the cooperating conveyor by which the finished castings are carried away from the Station VI apparatus.

The mold components to be assembled

The previously mentioned earlier applications Serial 511,941 (now U.S. Patent 2,850,775) and Serial 731,426 each disclose mold components such as are shown by Figs. 2–3 and 5–6 hereof, and the specifications of those two earlier applications each describe illustrative productions of castings in static molds prepared and assembled from such component parts.

As represented by Figs. 2–3 and 5–6 hereof, said mold parts include a lower flask half 12 referred to as the "drag," an upper flask half 14 referred to as the "cope," suitable sand 13 or the like packed into both the drag and the cope for receiving cavity impressions 16 from the casting pattern (not shown), and cores 15 (sand or other) which are placed within the mold cavity to form a hollow interior for the castings to be produced.

In the case of the first or "A" type mold of Figs. 2–3, the aforesaid casting pattern and the cooperating cores 15A are both shaped to provide for the simultaneous casting in each such "A" mold of four of the quarter-bend soil pipe fittings which Fig. 4 shows at 10A; and in the case of the second or "B" type mold of Figs. 5–6, the aforesaid casting pattern and cooperating cores 15B likewise are shaped to provide for the simultaneous casting in each such "B" mold of four of the Y-fittings which Fig. 7 shows at 10B. These "A" molds, as also shown on the pouring track 428 of Fig. 1, have their sprue openings 23A centrally located; while these "B" molds, as also shown on the pouring track 430 of Fig. 1, have their sprue openings at the offset location 23B of Figs. 5–6.

Accurate alignment of each top cope 14 with the bottom drag 12 upon which it is assembled is maintained, both in the "A" type molds and in the "B" type molds, by pins 17 which upstand from the drag ends and over which mating brackets 18 on the cope ends fit. Each drag flask 12A and 12B as well as each cope flask 14A and 14B is provided with left and right side support bars 28 that during assembly of the mold parts are utilized in the way which applications Serial 511,941 and 731,426 both show and explain.

In the foundry installation upon which the drawings hereof are based, the molds to be prepared and assembled and poured and otherwise handled are relatively large and comparatively heavy. Each assembled mold represented at 12—14 in Fig. 3 hereof and in Fig. 6 hereof weighs approximately 2000 pounds before pouring and about 2200 pounds after molten metal has been filled thereinto; and it has inside dimensions of 32 inches by 36 inches and is 18 inches tall (bottom of drag to top of cope). Weights and sizes of this magnitude rule out manual handling and make mechanized manipulation imperative.

The complete mold assembling system of Fig. 1

The novel mold elevator and cope stripper and drag turn over facilities of our present invention are incorporated into the Station VI portion of the Fig. 1 system of foundry mold assembly. Said complete system of Fig. 1 is built around the central mold assembling machine represented at 30 and is organized, as taught by our earlier application Serial 731,426, to accomplish the preparation and assembly and pouring and breaking up of foundry molds 12–14 which alternately are of the "A" type already described by reference to Figs. 2–3–4 and of the "B" type already described by reference to Figs. 5–6–7.

This central machine 30 has much in common with the machine 30 of U.S. Patent 2,850,775. It is equipped with a turret which is rotatable about a vertical axis and which is provided with five arm heads 60 that are spaced circumferentially (72° apart) around the turret. Each of these five arm heads is mounted for roll over about a horizontal axis radial to the turret center; and carried by each head 60 are upper and lower sets of flask receiving arms that extend outwardly from the head in radial relation to the turret. Such upper and lower arm sets on each of the five turret heads 60 are arranged to be moved towards and away from each other; and each of these ten arm sets (details not fully shown here) is adapted to have a drag flask 12 or a cope flask 14 or a core box (designated 26 in Fig. 1) with cores 15 therein inserted endwise into the arms and there supported via the aforementioned left and right side bars 28 on the inserted flask or box.

Provision is made for successively advancing this turret of central machine 30 through the angular distance (72°) between arm heads 60 whereby each set of upper and lower arms progressively occupies at-rest positions spaced around the turret periphery's rotative path at the Station locations designated I—II—III—IV—V in Fig. 1.

At the first or "Drag-On" Station I of Fig. 1 use is made of a drag-charging machine 160' and associated facilities that are organized as more fully described by our copending application Serial 731,426 and that function to insert into the upper arms of the turret heads 60 there successively coming to rest sand charged drag flasks 12 which alternately are of the "A" mold type (Fig. 2) and of the "B" mold type (Fig. 5) and each of which has its pattern impression 16 facing down.

At the second or "Core-On" Station II of Fig. 1 there are provided two parallel sets of core forming machines 185A—186A and 185B—186B plus outer and inner cooperating transfer cars 368 and 370 also organized as per copending application Serial 731,426; and these facilities function to insert into the lower arms of the turret heads 60 core boxes (represented at 26 in Fig. 1) with finished cores 15 therein, which cores are of the same alternate "A" mold type (Fig. 2) and "B" mold type (Fig. 5) as the mating drag flasks 12 in the upper arms of those receiving heads 60 and each of which cores faces up from its carrying box.

Following Station II is a third or "Core-Box-Off" Station shown at III in Fig. 1 and likewise organized as per our copending application Serial 731,426; and cooperating with the turret of central machine 30 are control means responsive to advancement by the turret of each arm head 60 from Station II to Station III for first moving the upper and lower arms on that head together thus bringing the cores 15 into the drag 12's pattern cavity 16 and then rolling said arms through 180° about the head axis thus placing the drag 12 on the bottom and the cores 15 on top thereof with the core box 26 above the cores and the two arms away from each other thus lifting the core box free both of the drag 12 and the cores 15 now resting in the drag's pattern cavity.

At the aforesaid "Core-Box-Off" Station III is mechanism 208'—210 for withdrawing the empty and now inverted core boxes 26 out of the upper arms of the turret heads there successively coming to rest, for turning each withdrawn core box over and interchanging its two ends, and for returning those turned over boxes 26 to "Core-On" Station II via a gravity track 187 in the same alternate "A" type and "B" type order as the boxes come out of machine 30 at III.

At the fourth or "Cope-On" Station IV use is made of a cope-charging machine 240' and associated facilities that again are organized as per copending application Serial 731,426 and that function to insert into the now-empty upper arms of the turret heads 60 there successively coming to rest sand charged cope flasks 14 which are of the same alternate "A" mold type (Fig. 2) and "B" mold type (Fig. 5) as the mating drag flasks 12 in the lower arms of those receiving heads 60 and each of which has its pattern impression facing down.

Following Station IV is a fifth or "Mold-Off" station shown at V in Fig. 1; and cooperating with the turret of central machine 30 are control means responsive to advancement by the turret of each arm head 60 from Station IV to Station V for moving the upper and lower arms of that head together thus bringing the cope 14 down upon the drag 12 with the cope's pattern cavity fitting over the cores 15 now supported by the drag.

At the aforesaid "Mold-Off" Station V is a transfer car 424 plus cooperating facilities which are organized as per our copending application Serial 731,426 and which function to withdraw from the two closed arms of each turret head 60 there coming to rest the now assembled mold made up of the drag 12 and cores 15 and cope 14 brought together as just described; and the molds 12—14 thus withdrawn upon transfer car 424 alternately are of the "A" type (Fig. 3) and the "B" type (Fig. 6) earlier discussed.

And cooperating with central machine 30's turret are further control means responsive to advancement by the turret of each arm head 60 from Station V to the first named "Drag-On" Station I for moving the upper and lower arms on that head away from each other preparatory to repeating the mold assembly cycle outlined above.

In the installation reproduced by Fig. 1 hereof from our earlier application Serial 731,426 the so assembled "A" type and "B" type molds as alternately taken from machine 30 at Station V are delivered by the aforesaid transfer car 424 into respective register with the earlier mentioned first pouring and cooling track 428 for those "A" molds and with the companion second pouring and cooling track 430 for those "B" molds; and the operation diagrams of Figs. 8a through 8e clearly indicate (via their right portions) how such delivery actions take place.

By Station V feed carriages which our earlier application Serial 731,426 discloses more fully, each thus delivered "A" mold then is fed upon the entrance end of the "A" track 428 and each thus delivered "B" mold similarly is fed upon the entrance end of the "B" track 430. Once on its aforesaid track, each of these assembled "A" and "B" molds rides on left and right sets of side rollers which are shown at 462 in Fig. 9 and which contact and impart support to the left and right bottom edges of the mold's drag flask 12.

This feeding at Station V of each additional mold upon the entrance end of the "A" track 428 and of the "B" track 430 is accompanied by a pushing of all other assembled molds thereahead on the mold-carrying track along that track towards the exit end thereof; and in the case of each track the pushing force is transmitted through end bumpers on the mold drags 12, which bumpers are represented at 466 by Figs. 2–3 hereof and by Figs. 5–6 hereof.

During the time that each such mold occupies the second position from its track entrance end, molten metal is poured into the mold's sprue opening 23 via suitable apparatus represented in Fig. 1 at 460A for the "A" track 428 and at 460B for the "B" track 430; and these two pouring and cooling tracks 428 and 430 are sufficiently long as to permit the castings 10A (Fig. 4) in each of the "A" molds so poured at 460A and the castings 10B (Fig. 7) in each of the "B" molds so poured at 460B fully to solidify and to cool considerably before the molds reach the Station VI apparatus at the track exit ends.

Within the length span thereof designed "Z" in Figs. 1 and 8, both of said tracks 428 and 430 are provided with means which hold the cope 14 of each so poured "A" mold and of each so poured "B" mold firmly against the mold drag 12 therebeneath while the metal pouring is in progress and for a short time thereafter; and these referred to means "Z" are disclosed more fully and are claimed by a co-pending application Serial No. 740,792 entitled "Cope-to-Drag Clamping Facilities for Mold Assembling Installation" which was filed by us on June 9, 1958.

By said cope-to-drag clamping means each "A" mold and each "B" mold that is within the track span "Z" is subjected to a loading force which is applied downwardly upon the side bars 28 of the mold cope and which holds the mold cope 14 and its drag 12 firmly together while pouring of the molten metal actually is taking place, and also thereafter while the poured mold is being advanced through four succeeding positions along its cooling track (428 or 430). However as each of these poured molds leaves zone "Z" in approaching the track exit it is freed of such loading force, so that upon later arrival at Station VI the cope 14 thereof no longer is secured to the mold drag 12 and hence may freely be lifted therefrom without the need of the "unfastening" operation that is required when using mold end clamps of the conventional type which earlier application Serial 511,941 shows at 19 in its Figs. 4–5.

At Station VI the apparatus indicated by Fig. 1 includes a mold transfer car 468 plus our new mold elevator and cope stripper 470 plus our cooperating drag turn over device 472. This transfer car 468 is organized in the manner which Fig. 9 hereof shows, and it functions to receive and deliver into alignment with said mold elevator 470 each of the poured "A" molds which arrives at Station VI on track 428 and each of the poured "B" molds which arrives at Station VI on track 430.

Said Fig. 9 hereof reproduces Fig. 44 from our earlier application Serial 731,426 and it illustrates the apparatus by which the aforesaid mold delivery is accomplished. Represented therein are the elevator feed carriage 476 and drive cylinder 478 which via bar 480 act to push each received "A" mold and each received "B" mold off the transfer car 468 and into the elevator 470, all in the manner which earlier application Serial 731,426 explains by reference to its Fig. 45; also the cylinder 474 which, when controlled as per Fig. 48 of said earlier application, drives said transfer car 468 back and forth along rails 473 between the exit ends of the aforementioned "A" and "B" cooling tracks 428 and 430 in proper synchronism with the aforementioned arrival of the poured "A" and "B" molds at the exit ends of those tracks.

During operation of the Fig. 1 system, said Station VI feed carriage 476 and associated transfer car 468 of the just described Fig. 9 act in cooperation with each other to insert the said arriving "A" and "B" molds, as received upon the car 468, into said mold elevator 470 successively and in the same alternate "A" and "B" order as they are delivered to Station VI by tracks 428 and 430. For a graphical representation of how these actions take place, see the left portions of Figs. 8a through 8e hereof.

*How new mold elevator and cope stripper and drag turn over facilities contribute to Station VI operation*

Our novel mold elevator and cope stripper and drag turn over facilities of the present invention are incorporated into the Station VI portion of the complete Fig. 1 system in the manner which Figs. 1 and 8 hereof show generally at 470 and 472, and which later drawing views hereof disclose more fully.

Before looking at this inventively new apparatus in a detailed way, it will be helpful to consider the broad and vital operating functions which are performed thereby. During operation thereof, each poured "A" mold and each poured "B" mold which comes into the lower portion of elevator 470 (again see diagrams of Figs. 8a–8e) first has its cope flask 14 stripped upwardly away from its drag flask 12 and castings 10; the stripped cope 14 then is transferred from the elevator 470 upon a cope shakeout shown at 490 in Figs. 1, 8 and 13; and the empty cope flask 14 thereafter passes from shakeout 490 upon a downwardly inclined gravity track 415 (Figs. 1 and 8) by which it is returned to the cope charging apparatus 240' at Station IV.

The mold drag 12 and castings 10 from which the cope 14 has been stripped now is transferred from the elevator 470 into the Station VI turnover device 472. After receiving said drag 12 with castings, device 472 swings counterclockwise around a vertical axis to the dotted line position of Figs. 1 and 21 where it is in register with a track 532 which leads to drag and casting shakeouts shown at 492 and 494 in Figs. 1 and 24. Here the device 472 rotates around a horizontal axis through 180° and turns the drag flask 12 over with an accompanying dropping of the castings 10 out of the drag.

Said dropped out castings 10 next are pushed from device 472 upon the casting shakeout 494 in the manner indicated by Figs. 23a–24; the turned over drag 12 likewise is advanced by way of track 532 upon the drag shakeout 492 (Fig. 24) where all sand is removed therefrom; and this having been done the now-empty drag flask 12 passes from shakeout 492 upon a downwardly inclined gravity track 356 (Figs. 1, 8, 24) by which it is returned to the drag charging apparatus 160' at Station I.

Meanwhile the mold castings 10 as delivered from said turned over drag 12 upon the casting shakeout 494 are there freed of all sand and thence passed upon a conveyor shown at 502 in Figs. 1 and 24. By this conveyor 502 said finished castings 10 are carried away from Station VI (to the right in Fig. 1) and delivered into suitable cleaning equipment (not shown) through which they pass in preparation for shipment.

In going through and being acted upon by our Station VI apparatus, each drag 12 of an "A" type mold yields the four solidified castings which Fig. 1 shows at 10A on conveyor 502 at the extreme right thereof, while each drag of a "B" type mold similarly yields the four solidified castings which Fig. 1 shows at 10B closer to Station VI. Since the assembled and poured molds from Station V are fed into said Station VI apparatus in the alternate "A" and "B" order, already described by reference to the Figs. 8a–8e diagrams, the sets of finished castings 10A and 10B from the turned over mold drags 12 are therefore also delivered in the same alternate "A" and "B" sequence upon the castings conveyor 502; and they there thus line themselves up in the alternate "A" and "B" groups which Fig. 1 represents.

*Further details of the mold elevator and cope stripper 470 and the drag turn over 472 apparatus of our invention*

Further attention will now be given to the elevator 470 and drag turn over 472 portions of our new Station VI equipment. Looking first at the elevator and cope stripper 470, the carriage 482 thereof as shown by Figs. 10, 12, 13a–13d is at proper times lifted upwardly by cylinder 504 via piston 505 and rod 506 upon admission of pressure fluid into the cylinder's lower port 507. Such admission elevates carriage 482 from the bottom position of Figs. 10, 12, 13a–13b to the top position of Figs. 13c–13d; and the carriage 482 is thereafter lowered at proper times by removing supply of pressure fluid from port 507 and connecting that port with an exhaust line.

The just mentioned pressure fluid for operating this elevator cylinder 504 is supplied thereto through a valve shown at SV25 in Fig. 11 as communicating with the fluid supply line 276 and with the exhaust supply line 277 of earlier applications Serial 511,941 and Serial 731,426. Control circuits for the left and right windings of this valve SV25 are illustrated in Fig. 11 as being energized from the supply conductors 280 and 281 of the same two earlier applications, and as including switches 800, 801, 802, 803, 804 and 805' later to be described. Other control organizations for accomplishing the same purpose are of course possible.

Each poured mold 12—14 that is fed into the lowered carriage 482 by the pusher bar 480, as shown by Figs. 13a—13b, has its drag flask 12 initially supported on rollers 510 which are mounted on left and right stationary cross bars 511 forming part of the elevator's base structure. This is clearly shown by Figs. 12 and 14. Following withdrawal of the Fig. 9 feeder bar 480, the carriage 482 is raised due to energization of the right SV25 winding over a circuit shown by Fig. 11 as including the now-closed "carriage-occupied" switch 800 within elevator 470 (Fig. 13b) plus the now-closed rear limit switch 803 on the feed carriage 476 of Fig. 9 plus the now-closed "carriage down" switch 804 at the elevator botom (Figs. 13a—13b).

Such energization shifts the SV25 elements (Fig. 11) to the right with accompanying flow from line 276 into the Fig. 11 cylinder 504's lower port 507 of pressure fluid which by raising cylinder piston 506 and rod 505 moves the elevator carriage 482 into the raised or top position of Fig. 13c. Early during this carriage elevation, cope stripping rollers 512 mounted on carriage members 513 (as Figs. 10, 12, 13 show) engage the cope side bars 28 and thus lift the cope 14 away from drag 12 while the drag still rests on stationary rollers 510.

Such lifting or stripping action continues until a third set of left and right rollers 514 provided on the carriage near its bottom (see Figs. 11, 12, 14) rise up into engagement with the drag side bars 28. At this point the cope 14 rides in the carriage substantially above the drag 12 therebeneath, with such spacing being as shown by Fig. 13c. Said same vertical spacing between cope and drag is maintained while the carriage 482 continues to rise; and it continues until and after the carriage has reached its top position of Fig. 13c.

Cooperative actions on the part of the drag turn over apparatus come into the picture at this stage of the Station VI cope stripping and mold lifting cycle. Said turn over device comprises a base pedestal shown at 517 in Figs. 15, 17 and 24 upon the top of which there is supported the head represented at 516 in Figs. 17, 19, 20–20a, 21–21a, 23–23a, 24 as being swingable around the vertical mounting shaft 518 between the two positions respectively diagrammed by Figs. 21 and 21a; and swinging movement from one to the other of these two positions (also shown in full lines and dotted by Fig. 1 at Station VI) is at proper times imparted to the head 516 by the hydraulic cylinder 520 of Figs. 17, 18, 21–21a.

Pressure fluid for operating this head swinging cylinder 520 is supplied thereto through a valve shown at SV28 in Fig. 21 as communicating with the fluid supply line 276 and with the exhaust fluid line 277 mentioned previously. Control circuits for the left and right windings of this valve SV28 are illustrated in Fig. 21 as being energized from the earlier mentioned supply conductors 280 and 281 and as including switches 806', 807', 809, 810', 812 and 813 later to be described. Other control organizations for accomplishing the same purpose are of course possible.

Extending from the right end of this head 516 and supported therein for rotation therewith about the horizontal axis of member 521 is the turn over assemblage designated 472' in each of Figs. 10, 13, 15, 17, 19 and 20 through 24. The mentioned rotation takes place through a range of 180° which is traversed by assemblage 472' in going from the drag-upright position of Fig. 22 to the drag-turned-over position of Fig. 22a; and such turn-over rotation (and return) is at proper times imparted to assemblage 472' through member 521 by a hydraulic motor shown at 522 in each of Figs. 16–17 and 19 through 24.

Pressure fluid for operating this hydraulic turn over motor 522 is supplied thereto through a valve shown at SV29 in Fig. 16 as communicating with the fluid supply and exhaust lines 276 and 277 previously mentioned. Control circuits for the left and right windings of this valve SV29 are illustrated as being energized from the electrical supply conductors 280 and 281 and as including switches 807, 809, 810', 811' 812 and 813 later to be described. Other control organizations for accomplishing the same purpose are of course possible.

The turn over assemblage 472' utilizes left and right side arms 524 along the inner faces of which are disposed top and bottom rows of rollers 76' positioned to accommodate therebetween the left and right side bars 28 of each drag flask 12 that is drawn into the assemblage from elevator 470 (Fig. 13) in the manner which Figs. 20–20a indicate. Such indrawing of a drag 12, as well as later ejection thereof, is at proper times accomplished by a hydraulic cylinder 526 whose piston 527 connects via rod 528 with an ejector plate 530 and a draw-in latch 531; and both of these members 530—531 thus can be moved by cylinder 526 back and forth through the assemblage casing 472' between a first or extended position of Fig. 20 and a second or indrawn position of Fig. 20a.

Pressure fluid for operating this drag draw-in and ejector cylinder 526 is supplied thereto through a valve shown at SV27 in Fig. 20a as communicating with fluid supply and exhaust lines 276 and 277. Control circuits for the left and right windings of this valve SV27 are illustrated as being energized from the electrical supply conductors 280 and 281 and as including switches 802', 805, 806, 807, 808, 810, 811 and 812 later to be described. Other control organizations for accomplishing the same purpose are of course possible.

Starting with the Station VI elevator 470 in the condition of Fig. 13c wherein the carriage 482 is at the elevator top carrying a stripped cope 14 on its upper rollers 512 and a mold drag 12 (with castings 10) on its lower rollers 514, the turn over assemblage 472' in the full line position of Fig. 1 (also shown by Figs. 8b and 8d) extends the latch 531 of Fig. 20 engaging it behind the inner rim of said drag flask 12 in the way which Fig. 20 shows. Such latch extension results from energization of the left SV27 winding over a circuit shown by Fig. 20a as including switch 805 closed when elevator carriage 42 is in its raised position (Fig. 13c) plus switch 802' closed when a drag flash 12 is in said raised carriage 482 (also Fig. 13c) plus switch 806 closed when turn over assemblage 472' is in register with elevator 470 (Fig. 21 and full lines Fig. 1) plus switch 810 closed when that assemblage is in its non-turned over position (Fig. 22) plus switch 809 closed when latch 531 and rod 528 are withdrawn (Fig. 20a); and said left winding energization shifts the SV27 elements to the left with accompanying flow of pressure fluid into the left end of cylinder 526 and resultant movement of piston 527 plus latch 531 into the right or extended position of Fig. 20.

As latch 531 reaches said Fig. 20 position and hooks behind drag 12's flask rim, a limit switch 808 closes and energizes the right SV27 winding over a circuit shown by Fig. 20a as including that switch 808. The resultant shift to the right of the SV27 elements causes flow of pressure fluid into the right end of cylinder 526 with an accompanying drawing (by piston 527 and rod 528) of said latch 531 and the drag 12 to the left into the Fig. 20a position where said drag 12 has been taken out of the elevator 470 and entered into the turnover head 472', as Figs. 20a and 21 both show. Here the drag side bars 28 are engaged by the left and right sets of supporting rollers 76' on side arms 524, as Fig. 22 indicates.

The turnover assemblage 472' next is swung by cylinder 520 around vertical mounting shaft 518 from the Fig. 21 position in register with elevator 470 (shown full line by Fig. 1) to the Fig. 21a "third" position (shown dotted by Fig. 1) that is in register with the Figs. 1 and 24 track 532 which inclines downwardly from Station VI to the drag shakeout 492 leading to the entrance end of the empty-drag return track 356. Such assemblage swinging results from energization of the left SV28 winding over a circuit shown by Fig. 21 as including switch 806' closed when the turn over assemblage 472' is in its elevator-registering position (Fig. 21) plus switch 809 closed when the latch 531 and piston rod are withdrawn into assemblage 472' (Fig. 20a) plus switch 812 closed when a drag flask 12 is occupying that assemblage (Fig. 21); and said left winding energization shifts the SV28 elements to the left with accompanying flow of pressure fluid into the left end of cylinder 520 and resultant movement of piston 814 and arm 815 to the right, which movement swings turn over assemblage 472' into the above mentioned new position of Fig. 21a (also shown by Figs. 8a, 8c, 8e).

Turn over motor 522 now rotates the assemblage through 180° into the Figs. 22a–23 "fourth" position wherein the drag 12 has been completely turned over and is in that "turned over" condition supported within assemblage 472' via side bars 28 and rollers 76', as Fig. 22a shows. Such turn over rotation by motor 522 results from energization of the left SV29 winding over a circuit shown by Fig. 16 as including switch 807 closed when assemblage 472' occupies the Fig. 21a position in register with track 532 (Figs. 8a, 8c, 8e) plus switch 812 closed when a drag 12 is within the turn over assemblage 472' (Fig. 21a) plus switch 810' closed when that assemblage occupies the drag-upright position of Fig. 22. Said left winding energization shifts the SV29 elements (Fig. 16) to the left with accompanying flow of pressure fluid into the left port 816 of Fig. 16 motor 522 and resultant rotative movement by the motor vane 818 in the clockwise direction. This rotative movement is transmitted by drive member 521 (Fig. 21a) to assemblage 472' and thereby produces the drag turn over mentioned above.

The solidified castings 10 now drop out of the turned over drag flask 12 and are retained by the assemblage casing 472', as Figs. 22a–23 show. Part of the sand 13 (Figs. 2–3 and 5–6) as earlier packed into the flask at Station I may also fall out at this point, even though Figs. 22a–23–23a do not so indicate; moreover, the castings 10 here may at least partially break away from their associated sand cores 15.

Cylinder 526 next advances push out plate 530 from the indrawn position of Fig. 23 to the extended position of Fig. 23a. Such advancement results from energization of the left SV27 winding (Fig. 20a) over a circuit shown by Fig. 20a as including switch 807 closed when assemblage 472' is in register with shakeout track 532 (Fig. 21a and dotted lines Fig. 1) plus switch 811 closed when that assemblage is in its turned over position (Fig. 22a) plus switch 812 closed when a drag flask 12 occupies the assemblage arms 524 (Figs. 21a–22a); and said left winding energization shifts the SV27 elements to the left with accompanying flow of pressure fluid into the left end of cylinder 526 and resultant movement of piston 527 plus ejector plate 530 to the right and into the "fifth" or pushed out position of Fig. 23a.

By this action the castings 10 plus any loose sand 13—15 plus the turned over drag flask 12 are pushed from the assemblage casing 472'. Such pushing advances said drag 12 upon the rollers of the Fig. 24 track 532 which leads to the drag shakeout 492 (Figs. 1 and 24), and it sends the castings 10 and loose sand down the inclined plate 533 of Figs. 23a–24 and upon the casting shakeout 494.

Following such completion of the drag turn over and processing cycle, our apparatus 472 of Fig. 23a withdraws plate 530 and latch 531 back into the assemblage casing 472'. This is done through completion by limit switch 808 (Fig. 23a) of the Fig. 20a circuit over which the right winding of valve SV27 is energized upon completion of the push out action described above.

Said apparatus 472 of Fig. 23a then rotates assemblage 472' around horizontal member 521 from the turned over position of Fig. 22a back into the unturned position of Fig. 22. This is done by motor 522 upon completion, via Fig. 22a switch 811' (closed when assemblage 472' is turned over) plus Fig. 21a switch 813 (closed when the turn over arms 524 are vacant) plus Fig. 23 switch 809 (closed when push out plate 530 is withdrawn), of the Fig. 16 circuit for energizing the right winding of control valve SV29; with such energization causing flow into motor 522's right port 817 of pressure fluid which rotates shaft vane 818 counterclockwise through 180° and back into the original starting position represented in Fig. 16.

Said apparatus 472 of Figs. 21a–22 next shifts the assemblage 472' around vertical mounting shaft 518 (for head 516) from the track-532 registering position of Fig. 21a (shown dotted in Fig. 1) back into the elevator-470 registering position of Fig. 21 (shown full line in Fig. 1). This is done by cylinder 520 upon completion, via Fig. 21 switch 813 (closed when the turn over arms 524 are vacant) plus Fig. 22 switch 810' (closed when assemblage 472' is in unturned over position) plus Fig. 21 switch 807' (closed when head 518 occupies the "third" position of Fig. 21a), of the Fig. 21 circuit for energizing the right winding of control valve SV28; with such energization causing flow into cylinder 520's right end of pressure fluid which moves piston 814 and arm 815 to the left thus swinging head 518 and assemblage 472' back into the original starting position which Fig. 21 represents.

This reconditions said apparatus 472 for withdrawing another mold drag 12 (with castings 10) from the rollers 514 (Fig. 13c) of our raised elevator carriage 482 at Station VI and subjecting it to a processing cycle which exactly duplicates the one described by the foregoing paragraphs.

Meanwhile, the stripped cope 14 which Fig. 13c shows as being carried in the top of Station VI elevator 470 on the upper rollers 512 of the raised carriage 482 is withdrawn therefrom into a frame 535 here represented as being attached to the side of elevator 470 and as leading to the cope shakeout 490 that communicates with the empty cope return track 415 of Fig. 1. This withdrawal may be effected by any suitable means, such as those which the Fig. 13 views illustratively show in the form of a cylinder 536 with piston rod 539 on the end of which a latch 538 is attached.

When said latch 538 is projected into the elevator 470 as Fig. 13c shows, it hooks over the inside of cope 14's end wall; and as the piston 537 of cylinder 536 then is moved to the right (by hydraulic pressure fluid) it pulls the latch and the stripped cope 14 out of the elevator carriage 482 and upon receiving rollers 540 in frame 535. These rollers support the withdrawn cope 14 via its side bars 28.

Pressure fluid for operating this cope withdrawing cylinder 536 is supplied thereto through a valve shown at SV26 in Fig. 13d as communicating with fluid supply and exhaust lines 276 and 277. Control circuits for the left and right windings of this valve SV26 are illustrated as being energized from the electrical supply conductors 280 and 281 and as including switches 801', 805', 820 and 821 later to be described. Other control organizations for accomplishing the same purpose are of course possible.

The aforesaid projection of said latch 538 into the elevator 470 for hooking over the inside of a stripped cope 14's end wall, as in Fig. 13c, results from energization of the right SV26 winding over a circuit which Fig. 13d shows as including switch 821 closed when latch 538 is withdrawn (Fig. 13d) plus switch 805' closed when the elevator carriage 482 is raised (Fig. 13c) plus switch 801' closed when a cope 14 occupies said carriage on upper rollers 512 thereof; and said right winding energization shifts the SV26 elements to the right with accompanying flow of pressure fluid into the right end of cylinder 536 and resultant movement of piston 537 plus latch 538 into the left or extended position of Fig. 13c.

As latch 538 reaches said extended position and hooks over cope 14's flask rim, a limit switch 820 closes (Fig. 13c) and energizes the left SV26 winding over a circuit shown by Fig. 13d as including that switch 820. The resultant shift to the left of the SV26 elements (Fig. 13d) causes flow of pressure fluid into the left end of cylinder 536 with an accompanying drawing (by piston 537 and rod 539) of said latch 538 and the cope 14 to the right into the Fig. 13d position where said cope 14 has been taken out of the elevator and entered into the frame 535, as Fig. 13d shows.

Such transfer of the stripped cope 14 of Fig. 13c from elevator 470 into frame 535 having been accomplished, this cylinder 536 remains in the withdrawn condition of Fig. 13d until the elevator carriage 482 as later lowered to the Fig. 13a position has received another poured mold 12—14 (Fig. 13b) from the Station VI transfer car 468 and has elevated that new mold into the raised Fig. 13c position with accompanying stripping of the cope 14 thereof from the drag 12 and castings 10 thereof. When this happens, cylinder 536 once more advances latch 538 into the elevator top and then withdraws that newly stripped cope 14 into the frame 535.

Such new cope pushes the first cope 14 out of said frame and upon the cope shakeout 490 of Figs. 1 and 13. Said shakeout thereupon functions in conventional manner to remove sand 13 from the received cope flask 14; and at the same time it advances that now empty cope flask 14 down the slope of the vibrating shake out grating (see Fig. 13) and upon the similarly sloping roller track 415 (Fig. 1) via which the flask is returned by gravity to the "Cope-On" Station IV of the central assembling machine 30.

After each withdrawal from elevator 470 both of the stripped cope 14 and of the mold drag 12 with castings 10 in the manners aforesaid, the elevator carriage 482 is lowered from the raised position of Fig. 13d back into its original lowered position of Fig. 13a. This lowering is done by the elevator cylinder 504 of Fig. 11 upon completion, via Fig. 13d switch 801 (closed when the upper carriage rollers 512 are vacant) plus Fig. 13d switch 802 (likewise closed when the lower carriage rollers 514 are vacant) plus Fig. 13d switch 805' (closed when carriage 482 is raised), of the Fig. 11 circuit for energizing the right winding of control valve SV25; with such energization causing flow into cylinder 504's top port 822 of pressure fluid which moves piston 505 downwardly and back into the original lowered position of Fig. 13a.

This reconditions said elevator apparatus 470 for receiving another poured mold 12—14 from the Station VI transfer car 468 (Fig. 9) and subjecting it to a processing cycle which exactly duplicates the one described by the foregoing pages and which includes the cooperating cope stripping and drag turnover and other allied operations already explained.

Mold feeding at Station VI possible only when elevator 470 is empty

In the new Station VI apparatus here disclosed we provide interlocking means which permit the elevator feed carriage 476 of Fig. 9 to push another poured mold 12—14 off from the transfer car 468 only when the elevator 470's carriage 482 occupies its lowered position of Figs. 13a–13b and also is empty, as in Fig. 13a. Such interlocking is achieved by including in the Fig. 9 energizing circuit for the right winding of hydraulic valve SV21 a limit switch shown at 804′ in Figs. 13a–13b as being closed when said elevator carriage is down plus a second switch shown at 800′ in Fig. 13a as being closed when such lowered carriage is vacant.

Except for these two added switches 804′ and 800′, the SV21 valve control organization which Fig. 9 hereof represents for drive cylinder 478 of feed carriage 476 exactly duplicates the SV21 control organization which our earlier application Serial 731,426 shows in its Fig. 45 for this same cylinder 478; and the present Fig. 9 organization thus causes feed carriage 476 to operate in precisely the same way as said earlier application Serial 731,426 explains, as long as these added switches 804′ and 800 both are closed (as in Fig. 13a hereof shows).

Under these conditions the right SV21 winding of Fig. 9 can at proper times be energized in the normal manner which application Serial 731,426 describes. Each such energization shifts the SV21 elements to right with accompanying flow into cylinder 478's rear port (right in Fig. 9) of pressure fluid which drives piston 479 forwardly (to the left in Fig. 9) with resultant feeding via pusher bar 480 of another poured mold from the Station VI transfer car 468 into our new elevator 470.

If however either of switches 804′ and 800′ is open (as when elevator carriage 482 is not fully lowered or when it still contains a previously inserted mold), our supplemental control organization of Fig. 9 prevents such energization from being effected. The feed carriage 476 then remains withdrawn (as shown in Fig. 9 hereof) until such later time as both switches later do close, thereby indicating that the elevator carriage 482 has been completely lowered and also is vacant (see Fig. 13a) and that elevator 470 thus is in readiness to receive another assembled mold 12—14 from the Station VI transfer car 468.

Summary

The mold lifting and cope stripping and drag turn over operations which follow each such reception thereupon proceed in the described fully automatic manner under the governing actions of our associated control means; and those operations result in the actions which Figs. 8a through 8e hereof diagram. From said Fig. 8 series of drawing views it will become evident how poured molds of the "A" type and the "B" type are successively introduced into our novel Station VI apparatus 470—472 and processed thereby in alternate "A" and "B" order. It is however not imperative that the molds so processed be of such alternately differing types, since said Station VI apparatus is capable of acting with equal effectiveness upon molds either which all are of the same type or which if of differing types come into the apparatus in any desired sequence (non-regular alternating or other).

Our new Station VI apparatus being fully automated performs all disclosed mold elevating and cope stripping and drag turn over functions without the aid of or need for any human operator or attendant. Elevator 470, moreover, in raising the cope flasks 14 and the drag flasks 12 to the elevated levels which Figs. 13c–13d indicate conditions those cope and drag flasks for their described "self return" along the gravity tracks 415 and 315 to the lower level of central machine 30.

And finally, our coordination of this Station VI apparatus with other portions of the complete Fig. 1 system is so unique that each drag flask 12 in so returning arrives at Station I and each cope flask 14 in so returning arrives at Station IV with the flask's two ends unchanged from the relative position which they had when the flask began its previous passage into and through the central assembling machine 30 and along one of the pouring tracks 428 and 430 and thence into and out of this new equipment at Station VI.

Our inventive improvements as here shown and described are therefore extensive in their application and hence are not to be limited to the specific form here disclosed by way of illustration.

What we claim is:

1. In a foundry installation utilizing a mold assembling machine into which sand-charged drag flasks are successively introduced at one station and rolled over in the machine and into which cope flasks charged with sand by apparatus at a low elevation are successively introduced at another station and brought together with the rolled-over drags to form assembled molds and from which machine those assembled molds are successively withdrawn at a further station, the combination of means communicating with said further station for receiving said assembled molds as there withdrawn and for pouring molten metal into each such received mold, a cope stripping elevator having a carriage which is movable between a lowered position and a raised position and which occupies said lowered position when the elevator is empty, means for delivering the aforesaid poured molds to said elevator in successive order and for inserting each such delivered mold into said elevator carriage while same is in its lowered position, means in said elevator activated by each such mold insertion for moving said carriage upwardly and with it first only the upper cope flask of the inserted mold and then also the lower drag flask whereby when the carriage reaches its said raised position the mold cope has been stripped away from and is spaced above the mold drag and castings therein and then also is substantially higher than the aforesaid low elevation cope charging apparatus at said mold assembling machine's other station, means thereupon operative to withdraw both said drag flask with castings and said stripped cope flask laterally from said carriage and out of said elevator, means thereafter effective to return said now-empty elevator carriage to its said lowered position where it is ready to receive another poured mold, a cope shakeout disposed adjacent the upper portion of said elevator to receive each stripped cope flask following said lateral withdrawal thereof from the elevator carriage, and a track inclining downwardly from said high elevation shakeout to said low elevation cope charging apparatus and serving to return each empty cope flask from the shakeout to that apparatus under the action of gravity.

2. In a foundry installation comprising means for assembling molds and for pouring molten metal thereinto and for advancing those poured molds along a cooling track peparatory to a disassembly thereof, the combination of a mold elevator at the exit end of said track, a carriage in said elevator normally occupying a lowered position but at times moving upwardly into a raised position, means operative with that carriage in its said lowered position for inserting a poured mold from said track into the said carriage and elevator, means operative following each such mold insertion for moving said carriage upwardly and with it first only the upper cope flask of the inserted mold and then also the lower drag flask so that upon arrival of the carriage in its said raised position the mold cope has been stripped away from and is spaced above both the mold drag and the castings carried therein, means thereupon operative to withdraw both said stripped cope and said drag flask with castings from the said carriage and elevator, means thereafter operative to return the now-empty carriage to its said lowered position in readiness to receive another poured mold, and a turn over device which receives each of the said drag flasks as same is withdrawn from the elevator in the manner aforesaid and which thereafter functions first to turn that received drag flask over with resultant dropping of the carried castings therefrom and then to eject both those castings and the now-empty drag flask out of the device.

3. In a foundry installation comprising means for assembling molds and for pouring molten metal thereinto and for thereafter advancing each of those poured molds into an elevator by which the mold cope is stripped away from the mold drag and the solidified castings therein, a lower drag flask and an upper cope flask being included in each assembled mold, the combination of drag turn over apparatus adjacent said elevator, track means leading from said turn over apparatus and extending along one side of said elevator to drag and casting shakeouts, a turn over head assemblage forming a part of said apparatus and being swingable through a horizontal plane back and forth between a drag receiving position in register with said elevator and an ejecting position in register with said track means, means operative while said head assemblage is in its receiving position for transferring from said elevator into the head each mold drag flask from which the mold cope has been strapped in the manner aforesaid, means thereupon effective for swinging said head assemblage into register with said shakeout track means and for turning the head assemblage over with resultant dropping of the carried castings out of the drag flask within the head, means thereafter operative for ejecting said dropped out castings and said turned over drag flask from the head assemblage and upon said shake out track means, and means still later effective for bringing the now-empty head assemblage back into register with said elevator in readiness to receive another mold drag flask therefrom.

4. Drag turn over apparatus as defined by claim 3 wherein the recited head assemblage is provided with left and right sets of spaced roller rows 76' that are adapted to receive and supportingly engage left and right side bars 23 which extend along the two sides of each drag flask that is inserted endwise into the head assemblage for turn over thereby.

5. In a foundry installation utilizing a mold assembling machine into which drag flasks charged with sand by apparatus at a low elevation are successively introduced at one station and rolled over in the machine and into which sand-charged cope flasks are successively introduced at another station and brought together with the rolled over drags to form assembled molds and from which machine those assembled molds are successively withdrawn at a further station, the combination of means communicating with said further station for receiving said assembled molds as there withdrawn and for pouring molten metal into each such received mold, a mold elevator having a carriage which is movable between a lowered position and a raised position and which occupies said lowered position when the elevator is empty, means for delivering the aforesaid poured molds to said elevator in successive order and for inserting each such delivered mold into said elevator carriage while same is in its lowered position, means in said elevator activated by each such mold insertion for moving said carriage upwardly and with it first only the upper cope flask of the inserted mold and then also the lower drag flask whereby when the carriage reaches its said raised position the mold cope has been stripped away from and is spaced above the mold drag and castings with the drag flask then being substantially higher than the aforesaid low elevation drag charging apparatus at said mold assembling machine's aforementioned one station, drag turn over apparatus comprising a head assemblage disposed adjacent the upper portion of said elevator, means for transferring laterally out of said elevator and into said head assemblage each mold drag flask from which the mold cope has been stripped in the manner aforesaid, a drag shakeout disposed adjacent said turn over head assemblage at the same relatively high elevation, means for turning said assemblage over with resultant dropping of the carried castings out of the drag flask within the assemblage, means operative to eject said turned over drag flask laterally out of said head assemblage and upon said shakeout, and a track inclining downwardly from said high elevation shakeout to said low elevation drag charging apparatus and serving to return each empty drag flask from the shakeout to that apparatus under the action of gravity.

6. In a foundry installation comprising means for assembling molds and for pouring molten metal thereinto and for thereafter advancing each of those poured molds into an elevator by which the mold cope is stripped away from the mold drag and the solidified castings therein, the combination of drag turn over apparatus associated with said elevator, means for transferring from the elevator into said turn over apparatus each of the drag flasks and carried castings from which the mold cope has been stripped in the manner aforesaid, means forming a part of said apparatus for thereupon turning the received drag flask over with resultant dropping of the carried castings therefrom, means thereafter effective to eject both those castings and the now-empty drag flask out of the apparatus, a shakeout upon which said ejected castings are received and by which they are freed from sand while passing thereover, and a conveyor upon which those sand-freed castings are received from said shakeout and by which they are carried away from said drag turn over apparatus.

References Cited in the file of this patent
UNITED STATES PATENTS

| | | |
|---|---|---|
| 2,251,197 | Nestman | July 29, 1941 |
| 2,306,713 | Prucha | Dec. 29, 1942 |
| 2,695,432 | Young | Nov. 30, 1954 |
| 2,713,703 | Lasater et al. | July 26, 1955 |
| 2,850,775 | Northington et al. | Sept. 9, 1958 |